(No Model.)
A. EUSTON.
EXTRACTING OIL FROM SEEDS.
No. 594,390. Patented Nov. 30, 1897.
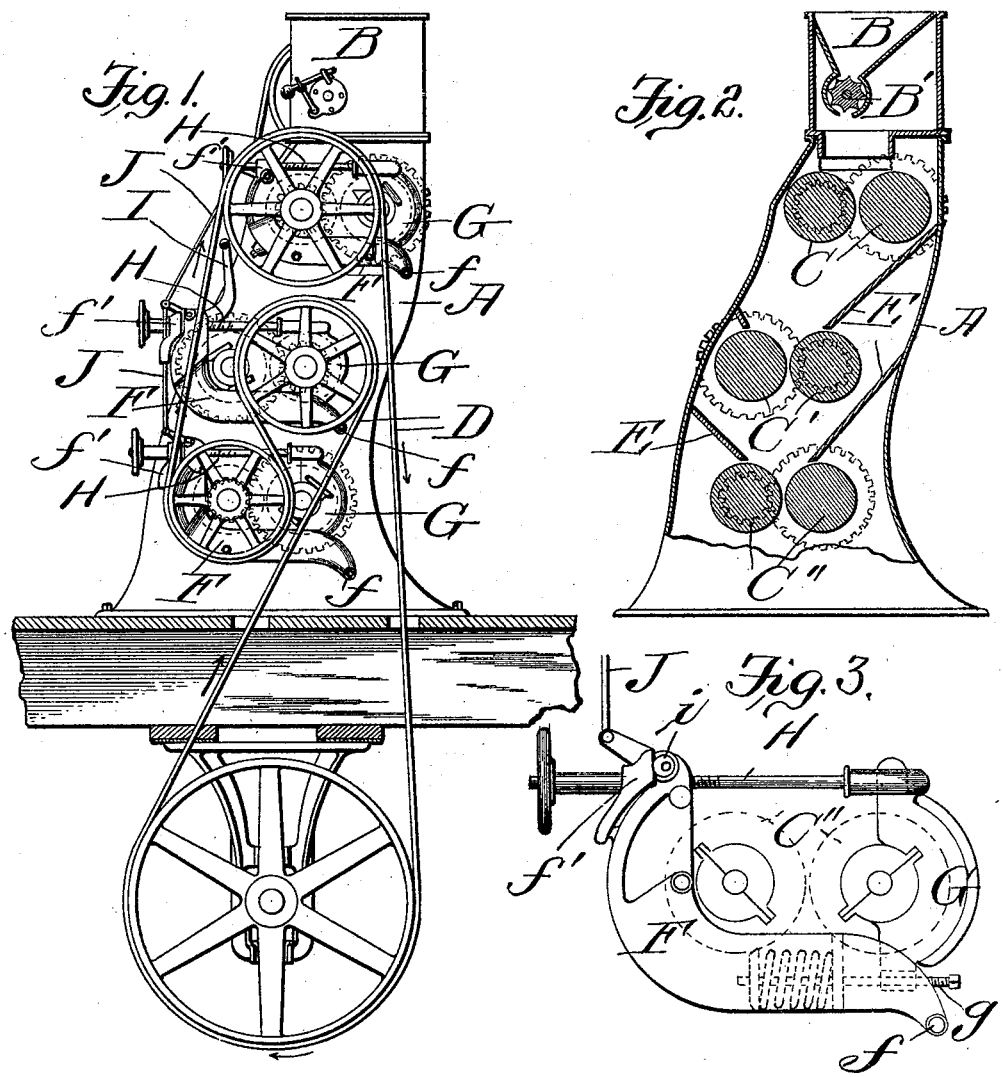
Witnesses:
G. A. Pennington
F. R. Cornwall
Inventor:
Alexander Euston,
by Paul Bakewell
his Atty.

UNITED STATES PATENT OFFICE.

ALEXANDER EUSTON, OF ST. LOUIS, MISSOURI.

EXTRACTING OIL FROM SEEDS.

SPECIFICATION forming part of Letters Patent No. 594,390, dated November 30, 1897.

Application filed June 23, 1897. Serial No. 641,881. (No specimens.)

*To all whom it may concern:*

Be it known that I, ALEXANDER EUSTON, a citizen of the United States, residing at the city of St. Louis, State of Missouri, have made certain new and useful Improvements in the Treatment of Oleaginous Seeds, of which the following is a full, clear, and exact description, reference being had to the accompanying drawings, forming a part of this specification, in which—

Figure 1 is an elevational view of a machine by which my invention may be carried into effect, and Fig. 2 is a vertical sectional view. Fig. 3 is a detail view of the mechanism by which the rolls are adjusted.

This invention relates to the treatment of oleaginous seeds for the production of oil and oil-cake, (especially linseed-oil and linseed-cake,) and more particularly to that step in the treatment of oleaginous seeds whereby the seed is ground and put in proper condition for tempering and the extraction of the oil subsequently by pressure.

Heretofore flaxseed (linseed) has been treated and prepared for tempering either by being passed through a single pair of horizontal rolls and then crushed under muller or edge stones, the two being used together and constituting a single process of preparation, or the seed has been crushed by means of a set of heavy iron rolls superimposed one above the other, so that the last action of the rolls on the seed is subjecting the seed to a pressure equivalent to the weight of the four rolls above.

Cotton-seed, after having the hull and lint removed by special machinery for that purpose, has been treated before tempering in substantially the same manner as linseed.

The muller or edge stones, to which I have referred above, have usually weighed from two thousand to four thousand pounds and the rolls described from fifteen hundred to twenty-five hundred pounds each.

The general belief among manufacturers of oil has been that it was necessary to break the oil-cells contained in the seed. The effect of crushing in the manner and with the apparatus described has been and is to crush the meal contents of the seed, crush or break the oil cells or sacs, and form, by uniting the crushed meal and crushed oil-cells, an oily mass, which mass is then transferred to the tempering kettle or heater and tempered there by the addition of moisture in the form of water or steam while the mass is being subjected to heat. The mass is then put into suitable presses and the oil extracted by pressure. The result of the crushing process described is that the meal is not in the best form to assimilate the moisture which is added in tempering. The cake made by this process is irregular and dark in color. The percentage of oil left in different parts of the cake varies widely, and uniformity of yield and perfection of quality cannot be obtained.

The treatment of the seed by my process preparatory to tempering proceeds upon a radically different principle. It is well known that oil and water do not readily mix or combine, and therefore in the process of manufacture the oil cells or sacs are not broken by rollers or edge stones at this stage of the manufacture, as all manufacturers have heretofore endeavored to do. The meal contents of the seed are preserved as much as possible and protected from being soaked in or combined with the oil contents of the seed, because, as already stated, the next step in the manufacture is to subject the meal to the action of moisture and heat with the intention of combining the moisture with the meal in forming a cake. The moisture cannot be made to combine with the meal if the meal is soaked or combined with the oil from the crushed oil cells or sacs. By perfectly combining the meal with the moisture the oil having no affinity for the meal so impregnated with water will pass freely therefrom when the mass is subjected to pressure. From the above it will be seen that instead of endeavoring to crush or rupture the oil cells or sacs, as must be done by the use of heavy muller-stones or heavy vertical series of rolls, my purpose is to break up the meal only or its integument, preserving the integrity of the oil cells or sacs as much as possible.

In the accompanying drawings I have illustrated a machine with which I have successfully practiced my invention, or the step in the process to which my invention relates. This machine consists of three sets of horizontal rolls between which the seed drops by gravity, the weight of the rolls being supported on their journals and not bearing on the seeds nor their contents. The rolls are so arranged relative to each other that when the seed passes between a pair of rolls they are fractured slightly, but not crushed—that is, upon leaving the machine the mass of seed is practically dry, and not wet or soaked with oil as when crushed by muller or edge stones, or by the heavy rollers superimposed one above the other, as has heretofore been practiced.

It may be that other forms of machines could be used to carry out this step of the process, which machines would accomplish the fracturing of the seed to substantially the some extent as the machine illustrated in the drawings. Therefore I do not wish to be undestood as limiting myself to the apparatus shown. This apparatus is not claimed as new, as horizontal rolls have been used in this form for other purposes. Rolls have been revolved at different and the same speed. Rolls have been used both smooth and corrugated; but I am not aware that such an arrangement of rolls for the object and purposes described has ever been used in the preparation of oleaginous seeds for the extraction of oil.

In the drawings, A indicates a suitable casing having a hopper B on top, into which the seeds are placed, the seeds being fed to the rolls below by a grooved feeding-roller B'. C, C', and C'' are three pairs of horizontal rolls between which the seed pass and are fractured to give access of the water or moisture in the tempering to the meal inside. A suitable belt D from a counter-shaft passes around pulleys on the ends of these roller-shafts, at one side of the machine, to drive one of each set of rolls, gearing being arranged on the other side of the machine between the rolls of a set. The rolls practically revolve at the rate of from four hundred to five hundred revolutions per minute.

E indicates a suitable plate arranged in the machine to direct the seed dropping from between a pair of rolls to the next pair of rolls beneath. The roller-shafts are mounted in boxes arranged in yokes pivoted on each side of the machine.

F indicates a yoke pivoted at $f$, in which the front roller of a pair is mounted.

G indicates a yoke yieldingly mounted on a threaded rod $g$, arranged on the yoke F, which yoke G carries a box in which is journaled the axle of the rear roller of a pair. The free ends of these yokes are connected by a threaded rod H, by turning the hand-wheel on the end of which the tension of the spring may be regulated, and in that way a greater or less pressure brought to bear between a pair of rollers. By turning down a handle I a cam $i$, operating on a nut $f'$, bearing against the free end of yoke F, through which the rod H passes, relieves the tension on the rollers and permits foreign particles, such as gravel, to pass freely through the machine. A connecting-rod J operates all the cams together to accomplish this.

After the seeds have been fractured they are placed in a suitable kettle or receptacle and subjected to heat, during which time moisture or water is introduced, which assimilates with the meal. After the mass has been tempered it is then subjected to pressure to extract the oil, which passes readily off, as it will not assimilate with the water-soaked meal. After the cake is pressed and the quantity of oil is extracted therefrom, as desired, which can be regulated to any degree with certainty to within a fraction of one per cent., (1%,) the cake is removed from the press and packed ready for shipment or consumption.

The meal produced by my process is dry and not smeared, coated, or soaked with the oil from the broken cells or sacs, is evenly colored—that is, there are no dark spots present in it—and in the form of cake is firm and compact.

Having thus described my invention, what I claim, and desire to secure by Letters Patent, is—

1. The process herein described for treating oleaginous seeds, the same consisting in fracturing or cutting the seeds without crushing the oil cells or sacs, tempering the seeds so fractured, and extracting the oil therefrom; substantially as described.

2. The process herein described for treating oleaginous seeds, the same consisting in cutting or fracturing the seeds so as to expose their meal contents at the same time preserving the integrity of the oil cells or sacs as far as possible, impregnating the meal contents of the seeds with moisture or water while the seeds are subjected to heat, and finally subjecting the seeds so treated to pressure to express the oil from the meal; substantially as described.

3. The herein-described process of preparing oleaginous seeds, for tempering, the same consisting in cutting or fracturing the seeds so as to expose their meal contents, at the same time preserving the integrity of the oil cells or sacs as far as possible; substantially as described.

In testimony whereof I hereunto affix my signature, in presence of two witnesses, this 19th day of June, 1897.

ALEXANDER EUSTON.

Witnesses:
   HUGH K. WAGNER,
   F. R. CORNWALL.